United States Patent [19]

Gale et al.

[11] Patent Number: 4,663,524

[45] Date of Patent: May 5, 1987

[54] APPARATUS FOR MEASURING PARAMETERS OF LIGHT SPOTS WITH A MOVING KNIFE-EDGE MASK

[75] Inventors: Michael T. Gale, Wettswil; Heinrich Meier, Urdorf, both of Switzerland

[73] Assignee: RCA Corporation, Princeton, N.J.

[21] Appl. No.: 823,017

[22] Filed: Jan. 27, 1986

[51] Int. Cl.$^4$ .............................................. H01J 3/14
[52] U.S. Cl. ................................ 250/237 R; 356/225
[58] Field of Search ................... 250/201, 216, 237 R, 250/237 G; 356/225; 350/266, 271, 275

[56] References Cited

U.S. PATENT DOCUMENTS 4,411,521 10/1983 Jourdan et al. ..................... 250/216
4,568,188 2/1986 Weber et al. ......................... 356/225

OTHER PUBLICATIONS

M. B. Schneider and W. W. Webb, "Measurement of Submicron Laser Beam Radii", Applied Optics, vol. 20, No. 8, 1981, pp. 1382-1388.
D. K. Cohen, B. Little, and F. S. Luecke, "Techniques for Measuring 1-Micron Diam Gaussian Beams", Applied Optics, vol. 23, No. 4, 1984, pp. 637-640.
J. A. Arnaud et al., Technique for Fast Measurement of Gaussian Laser Beam Parameters", Applied Optics, vol. 10, No. 12, 1971, pp. 2775-2776.
Y. Suzaki and A. Tachibana, "Measurement of the Micron Sized Radius of Gaussian Laser Beam Using the Scanning Knife-Edge", Applied Optics, vol. 14, No. 12, 1975, pp. 2809-2810.
A. H. Firester, M. E. Heller, and P. Sheng, "Knife-Edge Scanning Measurements of Subwavelength Focused Light Beams", Applied Optics, vol. 16, No. 7, 1977, pp. 1971-1974.
J. M. Khosrofian and B. A. Garetz, "Measurement of a Gaussian Laser Beam Diameter Through the Direct Inversion of Knife-Edge Data", Applied Optics, vol. 22, No. 21, 1983, pp. 3406-3410.
M. T. Gale and H. Meier, "Rapid Evaluation of Submicron Laser Spots", RCA Review, vol. 46, 1985, pp. 56-69.

Primary Examiner—David C. Nelms
Attorney, Agent, or Firm—Joseph S. Tripoli; George J. Seligsohn

[57] ABSTRACT

A two-dimensional knife edge mask comprised of an array of spaced periodic rectangular opaque regions (e.g., a chrome grating pattern layer deposited on one surface of a slide) separated by transparent different given spacing stripes between adjacent rectangular regions in each of the two orthogonal dimensions thereof, is linearly moved at a fixed velocity across an incident light spot, the direction of movement being oblique to the orthogonal dimensions of the rectangular regions and the distance of movement being sufficient to traverse at least one entire spacing strips in each of the two orthogonal dimensions. A photocell (which may be secured to the other side of the slide) senses the occulted light.

18 Claims, 16 Drawing Figures

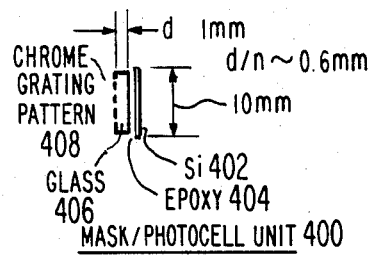
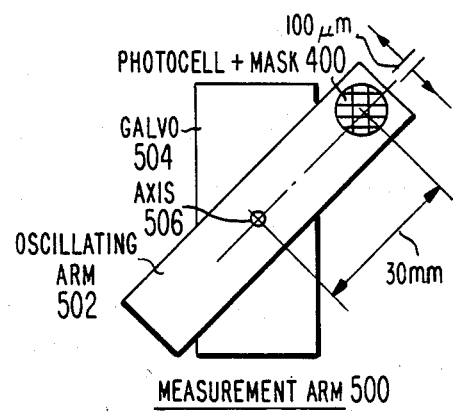
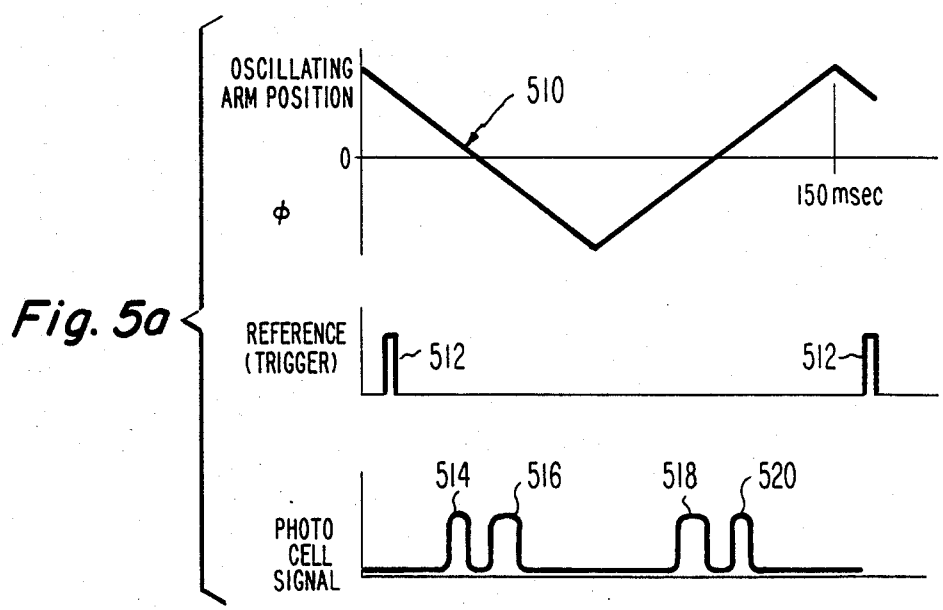

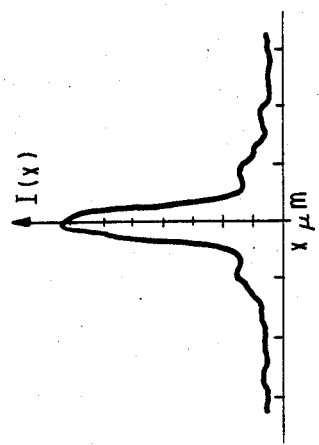
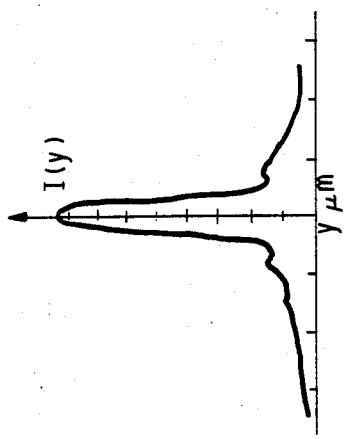
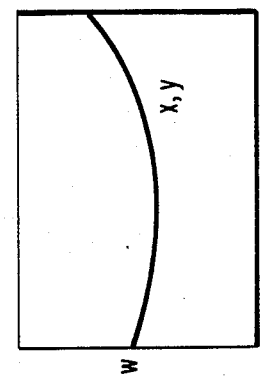
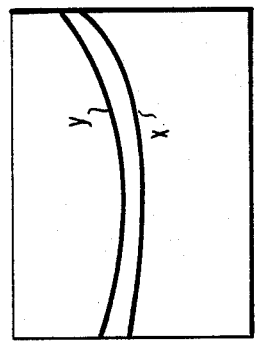
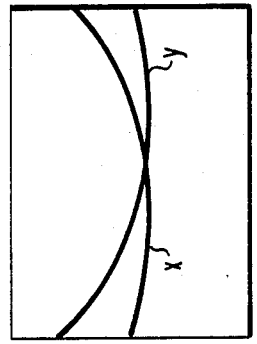

APPARATUS FOR MEASURING PARAMETERS OF LIGHT SPOTS WITH A MOVING KNIFE-EDGE MASK

BACKGROUND OF THE INVENTION

I. Field of the Invention

This invention relates to apparatus for measuring the cross-sectional parameters of a light spot and, more particularly, to such apparatus employing knife-edge techniques for measuring the size and intensity profile of a focused laser light spot in both of two orthogonal directions thereof.

II. Description of the Prior Art

A well known technique for measuring the size and intensity profile of a light spot employs an opaque member having a knife-edge which is moved through a cross section of a light beam. A light-power sensor, such as a photocell, is positioned on the other side of the opaque member from the incident light beam to intercept substantially all of the occulted light. The photocell signal is a measure of the occulted light power as a function of knife-edge position and the first derivative of this photocell signal is a measure of the occulted light intensity as a function of knife-edge position.

In the past, an accurate measurement required accurate knowledge of the knife-edge displacement. By way of example, the knife-edge can be displaced with a scanner comprised of a piezo-electric translator and this displacement can be monitored with an interferometer. In order to make a two-dimensional measurement of the spot profile, it was necessary to rotate the knife-edge scanner through ninety degrees, and repeat the measurements. This limited the accuracy of the measurement, since it is not possible to maintain a constant optical-axis (z-axis) position to sub-micrometer tolerances.

More recently, a simultaneous two-dimensional measurement has been demonstrated, using two orthogonal knife edges on a scanning "fishtail" shaped mask. The mask is translated using a synchronous motor with an additional optical encoder for calibration purposes. An alternative method for calibration employs a one-dimensional Ronchi ruling of known dimensions as the knife-edge mask in order to obtain a signal with features from which the speed of the mask translation can be determined.

SUMMARY OF THE INVENTION

The present invention is directed to apparatus capable of quickly measuring cross-sectional parameters of a light spot in both of both two orthogonal directions thereof with high precision (the width in each of two orthogonal dimensions can be measured with a tolerance of better than ±0.03 micrometers ($\mu$m) and the spot position along the optical z-axis can be measured to a tolerance of ±0.5 $\mu$m). The apparatus of the present invention is comprised of a combination of three elements.

The first of these three elements is a two-dimensional mask providing a knife-edge mask pattern comprised of an array of spaced periodic rectangular opaque regions arranged in rows and columns. The rectangular opaque regions have edges that operate as knife edges and define (1) a first set of parallel transparent stripes each of which has a first given width and a first given direction and (2) a second set of parallel transparent stripes each of which has a second given width and a second given direction orthogonal to the first given direction. The second given width is larger than the first given width, and the period of the opaque regions in each of the first and second given directions is large relative to both the first and second given widths. The mask has one side thereof adapted to be illuminated by a light spot of a light beam that is incident on the one side of the mask. The light spot has cross-sectional dimensions that are small relative to the first and second given widths.

The second element of the combination is comprised of means for substantially linearly moving the mask pattern with respect to the light spot at a substantially fixed velocity in an oblique direction with respect to both the first and second given orthogonal directions through a distance sufficient for the light spot to completely cross at least one of the parallel transparent stripes of the first set and at least one of the parallel transparent stripes of the second set.

The third element of the combination is comprised of a photocell situated on the other side of the mask from the one side thereof in proximity to the mask for intercepting and detecting substantially all of the light that passes through each illuminated transparent stripe of both the first and second sets, thereby deriving a photocell signal from the photocell indicative of the illuminating power of the light illuminating the photocell as a function of time.

BRIEF DESCRIPTION OF THE DRAWING

FIG. 4 illustrates a preferred embodiment of a mask/photocell unit for use in the present invention;

FIG. 5 illustrates a preferred embodiment of the measurement arm for oscillating the photocell/mask with respect to a light spot;

FIG. 5a illustrates, respectively, the position of the oscillating measurement arm of FIG. 5, the occurrence of a reference trigger, and the occurrence of the FIG. 5 photocell signal as a function of time;

FIGS. 7a and 7b illustrate typical width profiles derived by the spot measurement system of FIGS. 6 and 6a in each of two orthogonal directions; and FIGS. 8a, 8b and 8c illustrate, respectively, the manner in which each of the orthogonal widths vary as a function of optical-axis position for each of three different focused light beams that have, respectively, a concentric, an elliptical, and an astigmatic cross-sectional profile.

DESCRIPTION OF THE PREFERRED EMBODIMENTS

Figure 1:
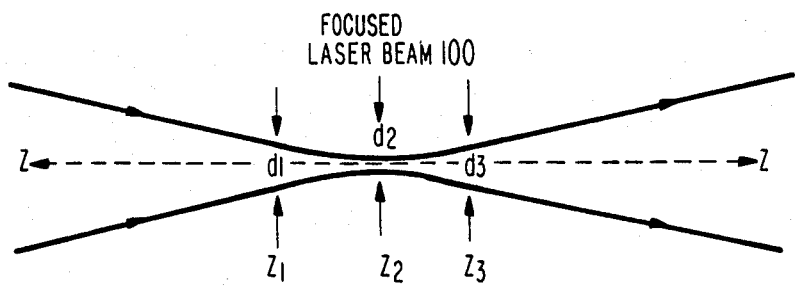
FIG. 1 schematically illustrates a focused laser light beam.

Referring to FIG. 1, there is shown a focused laser light beam, which is preferably diffraction limited. The optical axis of focused laser beam 100 is z. In traveling from left-to-right, focused laser beam 100 first converges to a minimum cross section and thereafter diverges. Thus, as indicated in FIG. 1, the cross sectional diameter $d_1$ at the axial position $z_1$ to the left of the minimum cross section is larger than the minimal cross sectional diameter $d_2$ at the axial position $z_2$. Similarly, the cross sectional diameter $d_3$ to the right of the minimal cross section is larger than the minimal cross sectional diameter $d_2$ at axial position $z_2$.

In FIG. 1 it is assumed that focused laser beam 100 is intended to have a concentric cross section, which is often the case. However, it should be understood that sometimes it is intended that focused laser beam 100 have a certain non-concentric cross section, such as elliptical. In any case, the minimum cross sectional dimension of a properly focussed laser beam is usually sub-micrometer in size. In order to insure that laser beam 100 is properly focused, it is necessary to measure the size and intensity profile thereof at one or more positions along the optical (z) axis thereof.

Figure 2:
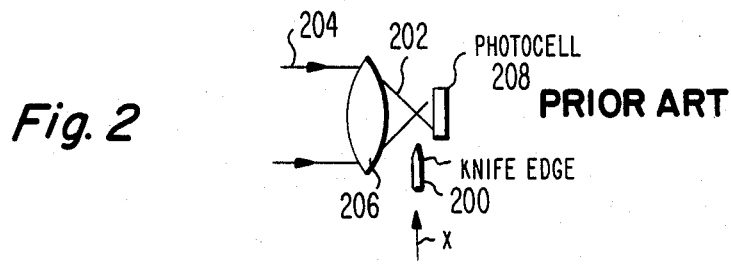
FIG. 2 schematically illustrates a prior-art knife-edge technique for measuring the cross-sectional widths of a focused light beam, such as a focused laser beam.

As indicated in FIG. 2, a prior art measuring system employed a knife edge 200, moving in the x direction (perpendicular to the z axis) across focused light beam 202. Focused light beam 202 is derived by passing collimated light beam 204 through focusing optics, such as convex lens 206. Initially, substantially all of the light of focused light beam 202 is incident on the surface of photocell 208. However, since knife edge 200 is positioned between lens 206 and photocell 208, more and more of the light initially incident on photocell 208 is occulted by knife edge 200, as knife edge 200 moves across focused beam 202.

Figure 2A:
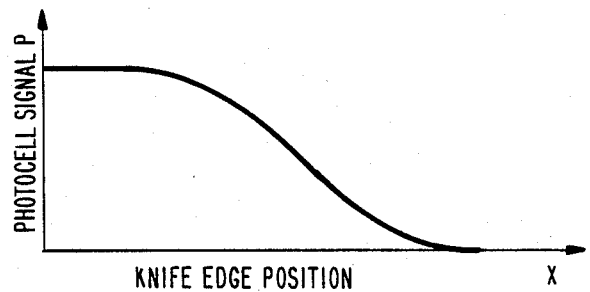
FIGS. 2a and 2b respectively illustrate a photocell signal P and a spot intensity P' as a function of knife-edge position.

FIG. 2a indicates the value of the light-power signal level P derived from photocell 208 as knife edge 200 moves in the x direction across focused light beam 202. As indicated in FIG. 2a, the value of the photocell signal P, which is initially at a maximum, is reduced to zero when all of the light of focused light beam 202 is intercepted by knife edge 200 and, hence, does not reach photocell 208.

Figure 2B:
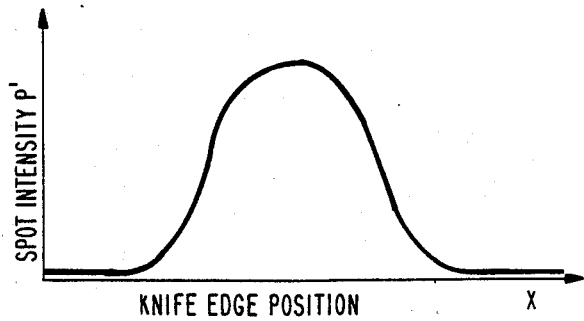

If the photocell signal derived from photocell 208 is differentiated with respect to knife edge position, in the x direction, the value of the differentiated signal P' with respect to knife edge position in the x direction is a measure of light spot intensity as a function of knife edge position in the x direction. The curve shown in FIG. 2b, which is the first derivative of the curve shown in FIG. 2a, indicates spot intensity P' as a function of knife edge position in the x direction.

Figure 3:
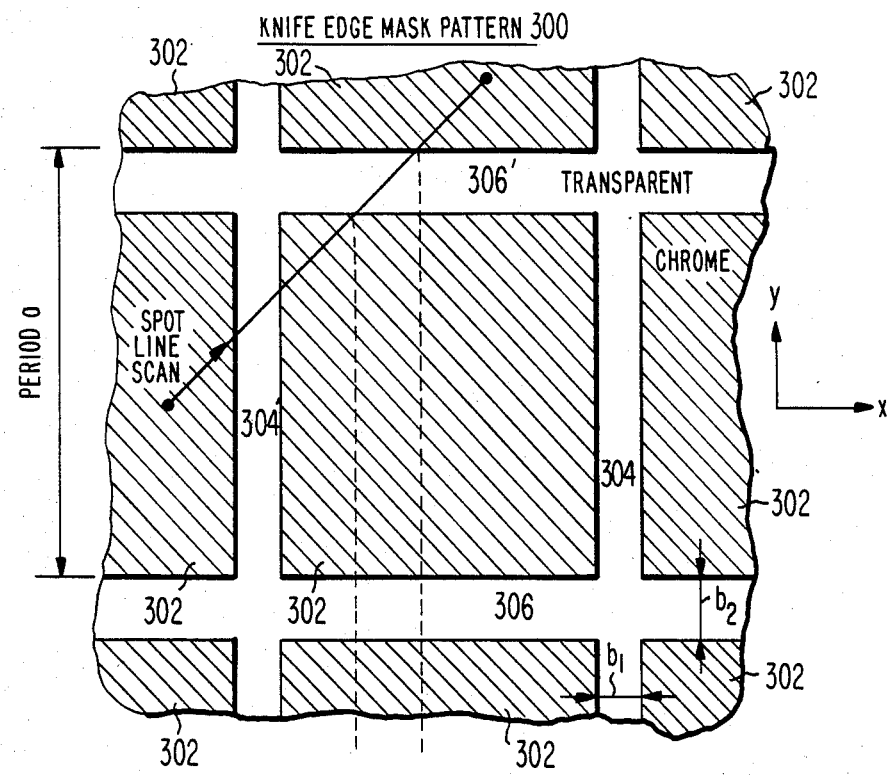
FIG. 3 is a diagram illustrating the relationship between a light-spot line scan of the mask pattern exhibited by a preferred embodiment of the knife-edge mask of the present invention.

FIG. 3 diagramatically illustrates a two-dimensional knife edge mask pattern of the type employed by the present invention. The knife edge mask pattern comprises an array of spaced periodic rectangular opaque regions 302 arranged in rows and columns. Opaque rectangular regions 302 may consist of a grating pattern photolithographically-defined in a chrome layer deposited on a transparent glass slide, by way of example. As indicated in FIG. 3, the respective edges of the rectangular opaque chrome regions 302 operate as knife edges and define (1) a first set of vertical parallel transparent stripes 304 each of which has a first given width $b_1$ and (2) a second set of horizontal parallel transparent stripes 306 each of which has a second given width $b_2$. As indicated in FIG. 3, $b_2$ is larger than $b_1$. As further indicated in FIG. 3, the periodic rectangular opaque regions 302 (which happen to be square) have a period a which is large relative to both $b_1$ and $b_2$. However, regardless of whether the rectangular opaque regions defining the knife edge mask pattern are square or not, the period of the opaque regions in each of two orthogonal directions thereof (e.g., vertical and horizontal) is large relative to both $b_1$ and $b_2$. In FIG. 3, a may be one millimeter (mm) in value, $b_1$ may be 20 $\mu$m in value, and $b_2$ may be 30 $\mu$m in value, by way of example. All of these values are much larger than the cross sectional dimensions of a light spot to be measured, which are typically sub-micrometer in value. This means that the line edges of the rectangular regions must be smooth to much better than one micrometer to provide an accurate measurement.

In FIG. 3, the horizontal direction is designated x and the vertical direction is designated y. As indicated, the focused knife edge mask pattern 300 and the focused light spot are moved along a straight line relative to one another to provide a spot line scan. Further, the direction of the spot line scan is oriented at an oblique angle (e.g., 45°) with respect to both the vertical (y) and horizontal (x) directions. As is also indicated in FIG. 3, the spot line scan is sufficiently long so that it traverses both the entirety of at least one vertical stripe 304 and at least one horizontal stripe 306.

Assume that knife edge 200 in FIG. 2 is replaced by knife edge mask pattern 300 of FIG. 3. Further, assume that knife edge mask pattern 300 is moved at a constant velocity across focused light beam 202 to provide a spot line scan, and that this spot line scan is oriented at an oblique angle with respect to both the vertical and horizontal stripes 304 and 306, as shown in FIG. 3. In this case, light will reach photocell 208 only during the occurrence of a first time interval during which the spot line scan, moving at a constant velocity, traverses vertical transparent stripe 304'. This first time interval is followed by the occurrence a second time interval during which the spot line scan, still moving at the same constant velocity, traverses horizontal transparent stripe 306'.

Figure 3A:
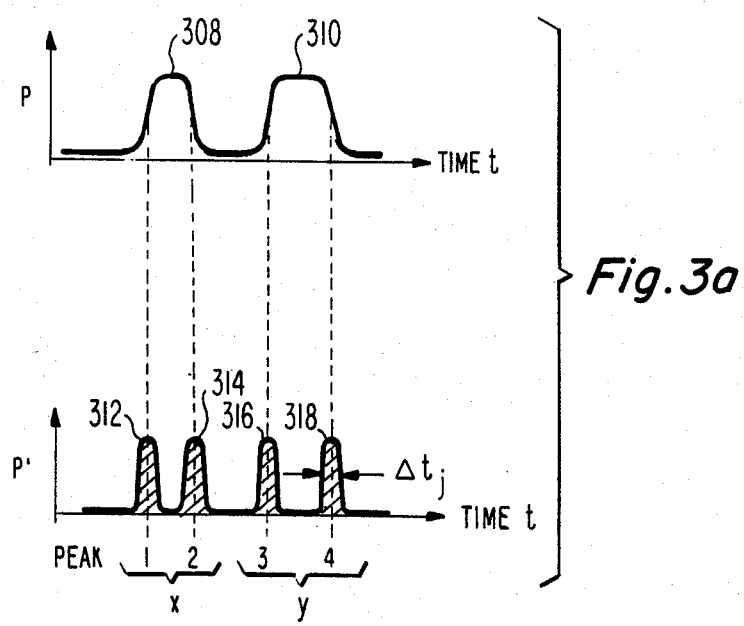
FIG. 3a illustrates the photocell signal P and the light intensity P' as a function of time that is derived in response to the light-spot line scan of FIG. 3.

Because vertical stripe 304 is narrower in width than horizontal stripe 306, the first time interval duration of the first peak 308 shown in FIG. 3a of the photocell signal P is less than the second time interval duration of second peak 310 thereof. Since the spot line scan occurs at constant velocity, differentiation of photocell signal P with respect to time provides P'. As indicated, P' consists of the four (absolute value) peaks 312, 314, 316 and 318, having respective widths $\Delta t_j$ (between their one-half peak amplitude levels). The absolute values of the peaks are shown for clarity. In reality, the first derivitive of opaque-to-clear mask transitions (312 and 316) are positive, while the first derivitive of clear-to-opaque transitions (314 and 318) are negative. The respective peaks 312, 314, 316 and 318 represent peak intensity profiles resulting from the spot line scan crossing, in order, the respective knife edges of the left edge of vertical stripe 304', the right edge of vertical stripe 304', the bottom edge of horizontal stripe 306', and the top edge of horizontal stripe 306'.

Since $b_1$ and $b_2$ (the respective widths of vertical and horizontal stripes 304 and 306) have known values, the effective knife-edge velocity components $V_x$ and $V_y$ in the horizontal and vertical directions can be computed from the respective central time positions $t_1 \ldots t_4$ of the four peaks 312, 314, 316 and 318 (with respect to the occurrence of a reference trigger) as follows:

$$V_x = \frac{b_1}{t_2 - t_1} \quad (1)$$

$$V_y = \frac{b_2}{t_4 - t_3} \quad (2)$$

Further, the spot positions with respect to a fixed arbitrary origin, can be determined, as follows:

$$x = V_x \frac{(t_1 + t_2)}{2} \quad (3)$$

$$y = V_y \frac{(t_3 + t_4)}{2} \quad (4)$$

The respective spot widths $W_x$ and $W_y$ are determined, as follows:

$$W_x = V_x \cdot \Delta t_1 = V_x \cdot \Delta t_2 \quad (5)$$

$$W_y = V_y \cdot \Delta t_3 = V_y \cdot \Delta t_4 \quad (6)$$

Since $b_1$ is smaller than $b_2$, the separation between peak 314 and peak 312 is always less than the separation between peak 318 and peak 316. Therefore, the x and y profiles can always be distinguished from one another, since the pair of peaks with the smaller separation always corresponds to the x-profile.

A light spot having sub-micrometer dimensions requires high numerical aperture focusing optics. Further, accurate measurement of the spot dimensions requires that substantially all the light transmitted through the mask pattern be incident on the photocell. Therefore, the photocell must be positioned very close to the knife-edge plane. For example, if the focusing optics lens has a numerical aperture of 0.95, a photocell having a diameter of 10 mm must be within 1.6 mm from the plane of the knife-edge, in order for the photocell to intercept substantially all of the light transmitted through the mask. The mask/photocell unit 400, shown in FIG. 4, meets this criterion.

As shown in FIG. 4, a 10 mm diameter silicon photocell 402 is cemented by an epoxy film 404 to the right side of a transparent glass slide 406 forming a substrate for chrome grating pattern 408 deposited on the left side of glass slide 406. Chrome grating pattern 408 conforms with the knife edge mask pattern 300 of FIG. 3. As indicated in FIG. 4, glass slide 406 has a physical thickness d equal to 1 mm. However, because the glass material from which glass slide 406 is fabricated exhibits an index-of-refraction n of approximately 1.5, the effective optical thickness d/n of glass slide 406 is only approximately 0.6 mm.

As indicated in FIG. 5, the mask/photocell unit 400 of FIG. 4 may be supported toward one end of oscillating arm 502 of measurement arm 500. As indicated in FIG. 5, oscillating arm 502 is pivotally mounted at axis 506 to the movement of scanning galvanometer 504. The distance between axis 506 and the center of mask/photocell unit 400 is quite large, being about 30 mm.

Scanning galvanometer 504 is energized with a periodic triangular waveform having a frequency of about 7 Hz, causing oscillating arm 502 to oscillate back and forth at a constant angular velocity. However, the amplitude of this galvanometer energizing waveform is sufficiently small to provide a maximum angular displacement of no more than 0.5°. However, at this small angle, the angle value in radians and the tangent of the angle value are substantially equal to one another. Therefore, for all practical purposes, the tangential velocity of mask/photocell unit 400 is also constant. At a 30 mm displacement between axis 500 and mask/photocell unit 400, and a typical angular displacement of mask/photocell unit 400 of about 0.2°, the peak-to-peak displacement mask/photocell unit 400 is about 100 $\mu$m, and the movement can be considered as linear.

Referring to FIG. 5a, there is shown by line 510 the oscillating arm position $\phi$ as a function of time. Since the galvanometer energizing waveform is triangular and the tangential velocity of oscillating arm 502 is substantially constant, the waveform of the oscillating arm position $\phi$ as a function of time also has a triangular periodic waveform. As indicated by line 510, each period of oscillating arm 502 is about 150 msec (i.e., occurs at the same frequency of about 7 Hz as the energizing waveform to galvanometer 504). As a reference, a trigger pulse 512, shown in FIG. 5a, is generated by means not shown at a particular point near the beginning of each cycle of oscillating arm 502. During the first half of each cycle, when oscillating arm 502 is moving in a direction assumed to be from right-to-left with respect to a stationary light spot, the narrower vertical stripe 304 of the knife edge mask pattern of the mask-photocell unit 400 will be traversed before wider horizontal stripe 306. Therefore, the width of the peak 514 of the photocell signal shown in FIG. 5a is narrower than the width of peak 516. However, during the second half of each cycle of oscillating arm 502, oscillating arm 502 moves back from left-to-right. Therefore, wider horizontal stripe 306 is traversed before narrower vertical stripe 304. Thus, in this latter case, the width of first-occurring peak 518 is wider than that of second-occurring peak 520. The respective positions of peaks 514, 515, 518 and 520 relative to the position of the reference trigger 512 during each oscillating cycle defines the mean position of knife edge mask pattern 300 with respect to a spot line scan. Preferably, this mean position should be adjusted so that the pair of peaks 514 and 516 and the pair of peaks 518 and 520 occur near the zero-value of oscillating arm position $\phi$, shown in graph 510 (where the tangential velocity is most linear).

Figure 6:
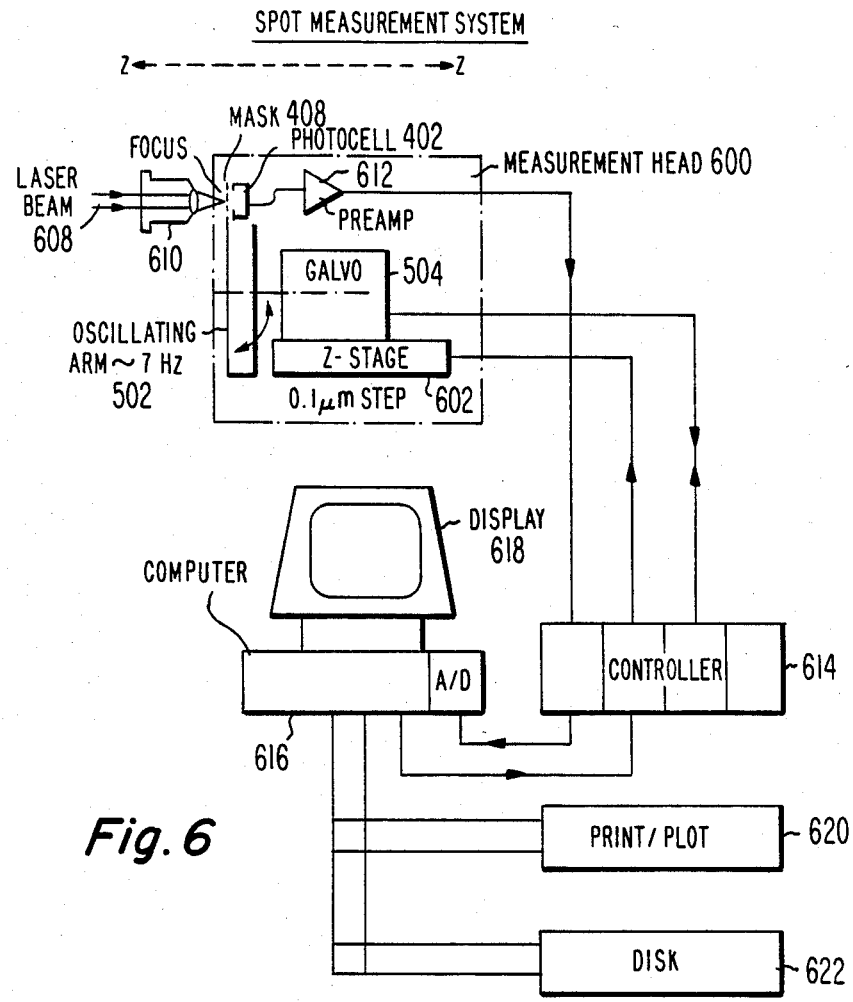
FIGS. 6 and 6a illustrate a preferred embodiment of a light-spot measurement system incorporating the present invention.
Figure 6A:
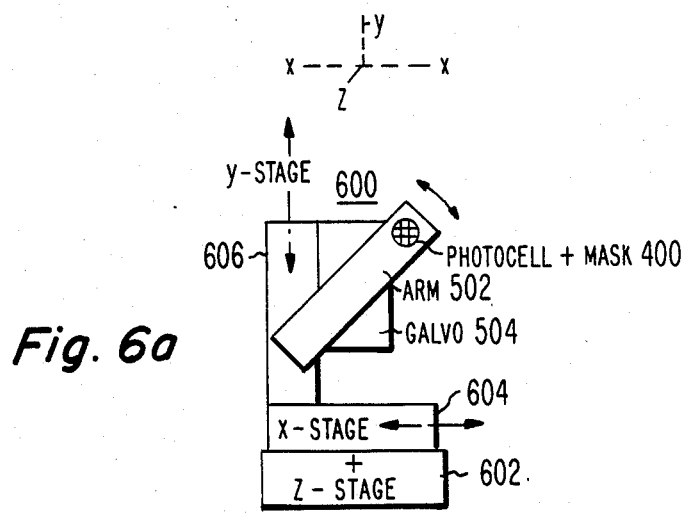

FIGS. 6 and 6a are directed to a preferred embodiment of the spot measurement system which comprise a measurement head 600 that incorporates the measurement arm 500.

As indicated in FIGS. 6 and 6a, measurement head 600 includes the combination of mask/photocell unit 400, oscillating arm 502 and galvanometer 504 (which together form measurement arm 500), mounted for movement in each of three orthogonal directions designated x, y and z, respectively. More specifically, z-stage 602 (shown in FIG. 6a as moving in a direction perpendicular to the paper surface) supports an x-stage (shown in FIG. 6a as movable in a horizontal direction) which, in turn, supports a y-stage (shown in FIG. 6a as moving in the vertical direction). Galvonometer scanner 504 of measurement arm 500 is supported by y-stage 606.

As indicated in FIG. 6, laser beam 608 and the optical axis of focusing optic 610 are oriented parallel to the z axis, while a surface of the mask and photocell unit 400 (made up of chrome grating pattern 408 and photocell 402) are oriented in the x-y plane. Further, mask 408 is oriented with respect to the direction of movement of oscillating arm 502 in the x-y plane so that the direction of movement of oscillating arm 502 is oblique (e.g. 45°) to both the x and y axes. Measurement head 600 further includes preamplifier 612 for amplifying the signal from photocell 402. As is indicated in FIG. 6, z-stage 602 is movable in 0.1 μm steps.

Besides measurement head 600, laser beam 608 and focusing optics 610, the spot measurement system of FIG. 6 comprises controller 614, computer 616, display 618, print/plot means 620 and disk means 622. As indicated, computer 616 incorporates an analog-to-digital converter (A/D) for converting analog signals applied to computer 616 from controller 614 into digital signals for use by computer 616.

Controller 614 includes a variable amplifier for the photocell signal (that has already been amplified by preamplifier 612 of measurement head 600). This variable amplifier produces a signal of about 10 volts amplitude for input to the A/D portion of computer 616. Controller 614 also includes galvanometer drive circuits comprised of an oscillator that produces a triangular wave signal which is fed through commercial drive electronics as an energizing signal for the galvanometer. In addition, a position feedback sensor driver is used for insuring maximum linearity and accuracy. Controller 614 further includes a z-stage control means that provides command signals from the computer to position the z-stage as required. The x and y stages (shown in FIG. 6a) (which are used solely for translating the position of mass/photocell unit 400 in the x/y plane to allow adjustment of the mask to a desired initial position for measurement with respect to the focused laser light spot incident thereon) are controlled independently of controller 614 and computer 616.

Computer 616 (which may be a small low-cost personal computer having the A/D converter added on thereto) controls the automatic measurement and analyzes the data derived from the photocell signal. Print/plot means 620 and disk means 622 (which may include a floppy disk and disk drive) facilitate storage and output of data. The amplified photocell signal is digitized by the additional A/D hardware portion of computer 616, and then stored in the computer 616 memory.

The signal acquisition is triggered by the reference pulse from the galvonometer oscillator. Typically a 12 bit digitization is used with a sampling interval of 8 μsec, which corresponds to a mask translation of 0.07 μm. The stored data (2000 samples) are then numerically differentiated and the resulting peaks analyzed. Averaging over a number of scans and interpolation between intervals readily enables the spot diameter $W_x$, $W_y$—full peak widths at half height—to be determined to better than ±0.03 μm. The peak position (x, y) is typically accurate to about ±0.5 μm and limited by mechanical vibration and stability considerations. A single scan and evaluation takes about 0.5 seconds. Typical spot profile outputs are shown in FIGS. 7a and 7b.

The measurement software of computer 616 also permits operation of the system to determine the spot widths ($W_x$, $W_y$) as a function of the z position. This enables a rapid evaluation of a focused spot, determining the z position for best focus, the spot parameters at this position and the degree of ellipticity and astigmatism present (if any). Typical outputs are shown in FIGS. 8a, 8b and 8c for circular, elliptical and astigmatic focused beams.

What is claimed is:

1. In apparatus capable of quickly measuring cross-sectional parameters of a light spot in both of two orthogonal directions thereof with high precision; the combination comprising:

a two-dimensional mask providing a knife-edge mask pattern comprised of an array of spaced periodic rectangular opaque regions arranged in rows and columns, said rectangular opaque regions having edges that operate as knife edges and define (1) a first set of parallel transparent stripes each of which has a first given width in a first given direction and (2) a second set of parallel transparent stripes each of which has a second given width in a second given direction orthogonal to said first given direction, said second given width being larger than said first given width, and said period of said opaque regions in each of said first and second given directions being large relative to both said first and second given widths;

said mask having one side thereof adapted to be illuminated by a light spot of a light beam that is incident on said one side of said mask, said light spot having cross-sectional dimensions that are small relative to said first and second given widths;

means for substantially linearly moving said mask pattern with respect to said light spot at a substantially fixed velocity in an oblique direction with respect to both said first and second given orthogonal directions through a distance sufficient for said light spot to completely cross at least one of the parallel transparent stripes of said first set and at least one of the parallel transparent stripes of said second set; and a photocell situated on the other side of said mask from said one side thereof in proximity to said mask for intercepting and detecting substantially all of the light that passes through each illuminated transparent stripe of both said first and second sets, thereby deriving a photocell signal from said photocell indicative of the illuminating power of the light illuminating said photocell as a function of time.

2. The combination defined in claim 1, further comprising:

means for differentiating said photocell signal with respect to time, and means responsive to the respective values of said first and second given widths, said photocell signal, and said differentiated photocell signal for determining said cross-sectional parameters in both of said two orthogonal directions.

3. The combination defined in claim 1, wherein:

the respective edges of said rectangular opaque regions that define said given first and second given widths of said respective parallel stripes of said first and second sets are smooth to a tolerance of a fraction of one micrometer, said period of said spaced rectangular opaque regions is of the order of one millimeter in value in each of said first and second given orthogonal directions, said first given width is of the order of twenty micrometers, and said second given width is of the order of thirty micrometers.

4. The combination defined in claim 1, wherein:

said mask is comprised of a plate of a transparent material having a given thickness between first and second opposite faces thereof and exhibiting a given index of refraction to light transmitted there-through said first of said opposite faces of said plate having a coating of opaque material thereon that defines said mask pattern; and said photocell having a surface that is fixedly secured in direct contact with said second face of said plate to thereby form with said mask a unitary measurement head.

5. The combination defined in claim 4, wherein:

said given thickness of said plate is of the order of one millimeter and the ratio of said given thickness to said given index-of-refraction is of the order of six-tenths of a millimeter; and said surface of said photocell in contact with second face of said plate is of the order of one centimeter.

6. The combination defined in claim 5, wherein:

the respective edges of said rectangular opaque regions that define said given first and second given widths of said respective parallel stripes of said first and second sets are smooth to a tolerance of a fraction of one micrometer, said period of said spaced rectangular opaque regions is of the order of one millimeter in value in each of said first and second given orthogonal directions, said first given width is of the order of twenty micrometers, and said second given width is of the order of thirty micrometers.

7. The combination defined in claim 4, wherein:

said light beam and light spot are stationary; and said moving means includes an arm attached at a first point to the movement of a galvonometer for rotating said arm through an angle in accordance with an energizing waveform applied to said galvonometer, said measuring head being mounted on said arm at a second point situated substantially a given distance from said first point, and means for applying to said galvonometer a given periodic isoscelestriangular waveform that causes said arm to oscillate linearly through a given angle proportional to the amplitude of said given waveform at the frequency of said given waveform, said given amplitude and hence said given angle being sufficiently small to provide substantially linear translational movement at a substantially constant velocity of said measuring head with respect to said stationary light spot.

8. The combination defined in claim 7, wherein:

said given distance is of the order of 30 millimeters, said given angle is about 0.5 degrees and said given frequency is about 7 hertz.

9. The combination defined in claim 7, wherein:

said moving means further includes an x, y and z three-stage positionary means to which said galvonometer and arm are attached for translational movement of said mask pattern of said measurement head parallel to any of three orthogonal axes x, y and z, said first and second given orthogonal directions being respectively oriented in said x-y plane at a given oblique angle with respect to said x and y axes.

10. The combination defined in claim 9, wherein:

said given oblique angle is substantially a 45° angle with respect to each of said x and y axes.

11. The combination defined in claim 9, including stationary focusing means having an optical axis oriented substantially parallel to said z-axis for focusing said incident light beam.

12. The combination defined in claim 11, wherein:

said focused incident light beam is a focused laser light beam; and said z stage of said positionary means is movable in steps of substantially 0.1 micrometers.

13. The combination defined in claim 12, wherein:

said given distance is of the order of 30 millimeters, said given angle is about 0.5 degrees and said given frequency is about 7 hertz.

14. The combination defined in claim 13, wherein:

the respective edges of said rectangular opaque regions that define said given first and second given widths of said respective parallel stripes of said first and second sets are smooth to a tolerance of a fraction of one micrometer, said period of said spaced rectangular opaque regions is of the order of one millimeter in value in each of said first and second given orthogonal directions, said first given width is of the order of twenty micrometers, and said second given width is of the order of thirty micrometers.

15. The combination defined in claim 9 further including:

control and processing means for controlling the operation of said positionary means and supplying said energizing waveform to said galvonometer, said control and processing means being responsive to said photocell signal which is fed back thereto.

16. The combination defined in claim 15, wherein:

said control and processing means includes means for deriving a reference trigger at a given point near the beginning of each cycle of said energizing given waveform, means for determining elapsed time with respect to said reference trigger during each cycle of said energizing given waveform, means responsive to said photocell signal and said reference trigger to command said x and y stages to move to respective positions in which said photocell detects said light spot at specified positions of each cycle of said oscillating arm, and means responsive to said photocell signal for differentiating said photocell signal as a function of time and deriving therefrom and from said determined elapsed times said cross-sectional parameter of said light spot.

17. The combination defined in claim 15, wherein:

said control and processing means includes a computer for programming the control operation thereof.

18. The combination defined in claim 15, further including:

a display for graphically displaying said cross-sectional parameters.

* * * * *